Sept. 15, 1959 R. M. PEEPLES ET AL 2,904,737
PLUGGING CONTROL SYSTEM
Filed Sept. 17, 1956
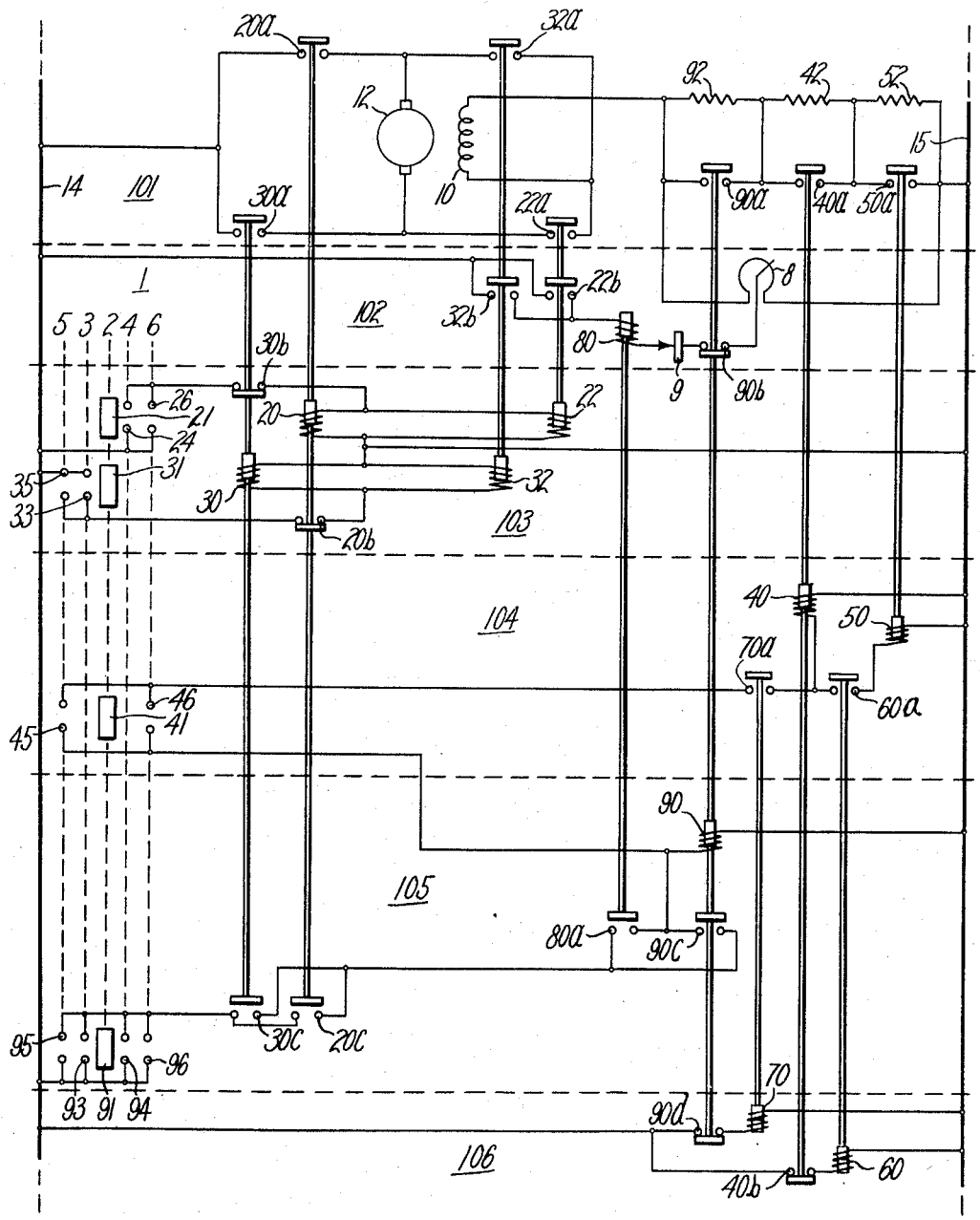
Inventors
Robert M. Peeples
Kay Miskinis
by Joseph E. Kerwin
Attorney United States Patent Office 2,904,737
Patented Sept. 15, 1959

2,904,737

PLUGGING CONTROL SYSTEM

Robert M. Peeples, West Allis, and Kay Miskinis, Milwaukee, Wis., assignors to Allis-Chalmers Manufacturing Company, Milwaukee, Wis.

Application September 17, 1956, Serial No. 610,117

8 Claims. (Cl. 318—261)

This invention relates to control systems generally and particularly to systems for controlling the starting, acceleration and reversal of electric motors. More specifically, the invention relates to motor control systems in which the motor may be plugged to a stop on reversal.

When a motor is plugged the counterelectromotive force is of a polarity that adds to the line voltage. When the motor is plugged at full speed the sum of the line voltage and the counterelectromotive force is approximately double the normal line voltage so it is necessary to provide some form of current limitation to the circuit to protect the motor windings.

Partial protection may be obtained for the plugging operation by inserting the resistance used to limit current during starting; however, this resistance is usually inadequate to satisfactorily limit the plugging current. To limit the current to a safe value during the plugging operation, an additional resistance is connected in series with the motor armature and accelerating resistors. This additional resistance is known as the plugging resistance.

It is an object of this invention to provide a new and improved control system for a reversible electric motor in which the insertion of the plugging resistance is controlled by an accurate measurement of counterelectromotive force.

Another object of this invention is to provide a motor control system for a reversible electric motor in which the plugging resistance may be automatically inserted at a wide range of values of counterelectromotive force.

It is still another object of this invention to provide a plugging control system which uses a low voltage relay to permit shorting of the plugging resistance only when the resulting current will not be injurious to the motor armature.

A still further object of this invention is to provide a motor control system in which interlock sequencing is provided to prevent accelerating contactors from removing the accelerating resistance from the motor circuit during plugging, thereby providing an increased measure of armature protection.

It is a still further object of this invention to provide a motor control system responsive to the sum of a pair of voltages one of which may be the same polarity as or opposite polarity to the other.

In one embodiment of the invention the plugging relay is connected to be energized by the sum of the counterelectromotive force of the motor, the IR drop across the motor armature and field windings and a portion of the IR drop across the plugging and accelerating resistance. When the total IR drop exceeds the counterelectromotive force of the motor, the plugging relay is actuated allowing plugging contactor to close and short out the plugging resistance. During the plugging operation the counterelectromotive force opposes the IR drop and prevents actuation of the plugging relay since insufficient voltage appears across the relay winding. A blocking rectifier in series with the plugging relay prevents a voltage of the wrong polarity from actuating the relay. This voltage condition could occur if the counterelectromotive force of the motor exceeded the IR drop by an amount sufficient to cause the plugging relay to pull in. When the plugging relay is closed, the plugging contactor is actuated and seals itself in, shorting the plugging resistance until the master switch is passed through the "Off" position.

When the plugging relay is deenergized the time delay relays controlling the accelerating contactors are prevented from actuating, thereby providing additional protection for the motor armature.

The accompanying drawing, illustrating the preferred embodiment of the invention, is divided into sections 101–106, each of which is discussed in order.

A conventional control circuit for reversing a series motor is shown in section 101.

The motor to be controlled is represented by a series field winding 10 and an armature winding 12, connected in a circuit between positive supply conductor 14 and negative supply conductor 15. The motor may be made to rotate in one direction by closing contacts 20a and 22a. Rotation in the reverse direction is accomplished by opening contacts 20a and 22a and then closing contacts 30a and 32a. This reverses the polarity of the voltage applied to armature 12. To limit the motor current during starting, resistors 42 and 52 are connected in series with the motor windings. Since reversing the motor at high speed will cause even higher currents than starting, an additional resistance 92 is included in the series circuit to protect the motor windings. It is desirable to have these resistors in the motor circuit only when the currents are likely to be excessive; therefore contacts 90a, 40a and 50a are provided to short out the resistors and remove them from the circuit when current protection is unnecessary.

A voltage sensing circuit is shown in section 102. This circuit responds to reversal at high speed which would create a heavy current through the motor if protective steps were not taken. The IR drop across resistors 92, 42 and 52 energizes plugging relay 80 connected at one end to the positive potential side of the motor armature 12 by means of contacts 22b or 32b, and at the other end to a variable tap on potentiometer 8 in parallel circuit with the plugging resistor 92 and accelerating resistors 42 and 52. To prevent the relay from being actuated by the reverse voltage of the motor armature during plugging, rectifier 9, in series with the relay, blocks current flow in a direction opposite to that produced by the IR drop during normal operation.

Directional control of the motor through directional contactors and a reversing master switch, shown in section 103, is conventional. In master switch 1 position 2 is the "Off" position, 4 and 6 are forward positions and 3 and 5 are reverse positions. In changing the master switch from a forward to a reverse position it is necessary to pass through position 2. The forward positions of the master switch actuate forward directional contactors 20 and 22 completing a circuit in section 101 for forward rotation of the motor. Reversing the master switch causes the forward contactors to drop out and connects the reverse directional contactors 30 and 32, completing a circuit in section 101 for reverse rotation of the motor. It will be noted that energizing the forward directional contactors opens contacts 20b in the energizing circuit for the reverse contactors, making it impossible for these to be accidentally energized. Protection against accidental energization of the forward contactors while the reverse contactors are actuated is provided by contacts 30b.

Acceleration control contactors 40 and 50 in section 104 provide high speed operation of the motor by shorting out resistors 42 and 52 by means of contacts 40a and 50a. With the master switch in position 5 or 6 segment 41 completes a circuit through contacts 45 or 46 to energize contactors 40 and 50 when contacts 60a and 70a are closed. In slow speed positions 3 and 4 contactors 40 and 50 remain deenergized and resistors 42 and 52 remain in the motor circuit to limit motor speed.

The control circuit for plugging contactor 90 is shown in section 105. When the motor is started from zero speed it is not necessary to have the plugging resistor 92 in the circuit. This resistor would reduce the starting current to a point where it would take a long time to bring the motor up to speed or perhaps fail to start under a heavy load. It is desirable to remove the plugging resistor from the circuit at all times the motor is running except when the motor is being plugged. The control circuit for contactor 90 begins with the positive supply conductor 14 to master switch 1 which has contacts 93, 94, 95 and 96, one of which is bridged by segment 91 in each of the forward and reverse positions of the switch, through contacts 20c or 30c, depending on which directional contactor is closed, to contacts 80a of plugging relay 80, through the plugging contactor 90 to negative supply conductor 15. When plugging relay 80, in section 102, senses a high additional counterelectromotive force, contacts 80a are opened, preventing the plugging contactor from removing the plugging resistance at a time when a damaging current would flow through the armature. When the relay sees only the IR drop of normal operation, the relay picks up, energizing contactor 90 which seals itself in through contacts 90c and opens the plugging relay circuit by means of contacts 90b.

It will be noticed that the accelerating relays in section 106 are directly across the supply conductors, being energized when the master switch is in the "off" position. Actuating the plugging contactor opens the circuit to the first accelerating relay and begins the timing cycle. Relays 60 and 70 are of the flux decay type which requires a lapse of time after deenergization for the flux to decay to the point where the relay drops out. When relay 70 completes the timing cycle it closes contact 70a, completing the circuit to energize contactor 40. When contactor 40 picks up it deenergizes timing relay 60 by opening contacts 40b. This relay runs its timing cycle and closes contacts 60a to complete the circuit to energize contactor 50.

Potentiometer 8 provides an adjustment of the response of the plugging relay circuit since some operating conditions will require more protection than others. For example, where the duty cycle is continuous more protection is desirable since the motor will not have a chance to cool.

To rapidly accelerate the motor in the forward direction, master switch 1 is moved to position 6. This completes a circuit from the positive supply conductor 14, through contacts 26 and segment 21 of master switch 1, through normally closed contact 30b of reverse contactor 30, to the actuating coils of contactors 20 and 22 connected in a parallel circuit relation, the other connection common to both coils leading to negative supply conductor 15. Contactors 20 and 22 actuate to close the normally open contacts 20a, 20c, 22a and 22b while opening the normally closed contact 20b. Thus, motor armature 12 is connected in circuit for forward rotation, a complete circuit being made from the positive supply conductor 14, through contact 20a and the motor armature winding 12 to contact 22a, through motor field winding 10 and resistors 92, 42 and 52 to negative supply conductor 15.

Actuating contactor 22 also closes contacts 22b completing a circuit from positive supply conductor 14 through closed contacts 22b to plugging relay 80, through blocking rectifier 9 and normally closed contacts 90b to the sliding contact on potentiometer 8. Relay 80 is energized by the difference in potential between positive supply conductor 14 and the sliding contact on potentiometer 8 when this difference is the same polarity as the IR drop of the current flowing in the resistors 92, 42 and 52. Rectifier 9 prevents a voltage of opposite polarity from energizing plugging relay 80. In other words, relay 80 will not be energized if the potential at the sliding contact on potentiometer 8 should reach a higher positive potential than the positive supply conductor.

When the motor starts from rest the potential across resistors 92, 52 and 42 due to the current flowing in the motor circuit causes a potential of the correct polarity to appear across plugging relay 80 since the counterelectromotive force of the armature is zero. This potential actuates relay 80 and closes contacts 80a. Contacts 80a complete a circuit to plugging contactor 90 starting with the positive supply conductor 14, through contacts 96 and segment 91, through contacts 20c and contacts 80a, through plugging contactor 90 to the negative supply conductor 15. Actuating plugging contactor 90 opens contacts 90b and 90d and closes contacts 90c and 90a. Since contacts 90c are in parallel with contacts 80a, the plugging contactor seals itself closed through its own contacts. Simutlaneously with the closing of contacts 90c, contacts 90b open and release the plugging relay. Shorting the plugging resistance by contacts 90a may momentarily reverse the polarity of IR drop under certain conditions of operation, which might cause erratic operation of the plugging contactor. To prevent this, relay 80 utilizes a normally open contact with an adjustable time delay on drop out, thereby insuring that the plugging contactor has time to positively seal itself in the actuated position before the contacts 80a are opened.

The opening of contacts 90d interrupts the circuit to timing relay 70 which is of the flux decay type. This relay remains in the actuated position until the flux decreases to a predetermined value and the relay drops out, at which point contacts 70a close, completing the circuit to actuate accelerating contactor 40 which shorts out accelerating resistance 42 by means of normally open contacts 40a. Contacts 40b are opened, interrupting the circuit to timing relay 60, also of the flux decay type. It will be understood that in this embodiment the timing interval is in the nature of a few seconds but where a longer timed interval is desired some other form of timing device could be used. After a predetermined time interval relay 60 drops out and contacts 60a are closed, thereby completing a circuit to actuate accelerating contactor 50 and close contacts 50a to short out accelerating resistor 52. At this point the entire potential difference between supply conductor 14 and 15 is placed across the motor windings 10 and 12 causing it to rotate at full speed. The time delay in removing resistors 42 and 52 interposed by timing relays 60 and 70 allows the motor to achieve sufficient speed and develop a counterelectromotive force to limit current through the motor to a safe valve.

To operate the motor at a lower speed the master switch is moved to position 4, moving segment 41 away from contacts 46 to open the circuit to contactors 40 and 50, causing them to drop out and again insert resistors 42 and 52 in the motor circuit. When contactor 40 drops out, contacts 40b close to energize timing relay 60 and open contacts 60a in circuit with accelerating contactor 50. Thus, in position 4 contactors 40, 50 have been deenergized to once more insert resistors 42 and 52 in the motor circuit to limit the current drawn by the motor. Timing relay 70 remains deenergized since there is need for this protective time delay only when the motor is accelerated from rest. If, after having moved the master switch from position 6 to position 4, it is again desired to accelerate the motor, the master switch is once more returned to position 6 where segment 41 bridges contacts 46. This immediately completes a circuit to contactor 40 which picks up, causing contacts 40a to close and short out accelerating resistor 42. Contacts 40b also are actuated to open the circuit to timing relay 60. Deenergizing relay 60 causes contacts 60a to close after a predetermined time interval and complete a circuit to actuate contactor 50. Contacts 50a close to short out accelerating resistor 52, once again placing the entire line voltage across the motor windings.

To rapidly reverse the motor, master switch 1 is moved from forward position 4 or 6, as the case may be, to position 2. With the master switch in position 2, the "Off" or neutral position, the circuits to all contactors are interrupted and the directional and accelerating contactors deenergized and the timing relays are energized. This disconnects the motor from the supply conductors and opens contacts 40a, 50a and 90a across resistors 42, 52 and 92, respectively.

Switch 1 is continued in motion to position 3 or 5. In either position a circuit is completed from the positive supply conductor 14 through segment 31 and contacts 33 or 35, through normally closed contacts 20b of forward contactor 20, to the actuating coils of contactors 30 and 32 connected in a parallel circuit relation with the other connection common to both coils leading to negative supply conductor 15. These contactors pick up and close normally open contacts 30a, 30c, 32a and 32b while opening normally closed contact 30b. The polarity of the potential applied to the motor armature is now reversed, a circuit being made from the positive supply conductor 14 through contacts 30a and motor armature winding 12 to contacts 32a, then through motor field winding 10 and resistors 92, 42 and 52 to the negative supply conductor. It will be noted that the counterelectromotive force of the motor armature is of a polarity that adds to the impressed voltage while the motor is turning in the reverse direction. Plugging relay 80 is connected to the positive supply conductor through contacts 32b and to the variable tap on potentiometer 8 by means of blocking rectifier 9 and normally closed contacts 90b. Motor armature 12 is now connected so the counterelectromotive force opposes the IR drop of resistors 92, 42 and 52. The potential difference between the positive supply conductor and movable contact on potentiometer 8 is at a lower value depending on the speed of the motor at reversal and the setting of potentiometer 8. When the movable contact is away from the end of potentiometer 8 closest to the negative supply conductor 15 the plugging relay 80 will not actuate until the motor armature counterelectromotive force is at the lowest possible value. When the movable contact of potentiometer 8 is at the end of the potentiometer 8 nearest the negative supply conductor 15, it is across substantially the entire IR drop of resistors 92, 42 and 52 and therefore it takes a much higher value of counterelectromotive force of the motor armature to prevent the plugging relay from actuating. The potentiometer provides an easy adjustment of the pickup point of the plugging relay over a range from 100% speed in the reverse direction to zero speed in the forward direction.

When the movable contact is farthest away from negative supply conductor 15, the plugging relay will not actuate until the IR drop of motor armature 12 and field 10 exceeds the counterelectromotive force of the motor armature by an amount at least equal to the pickup voltage of the plugging relay. This can be made equal to the point of zero speed in this embodiment due to the use of a low voltage coil on the plugging relay.

It is possible to achieve this wide range of operation with a relay that is actuated to provide protection, but this mode of operation is not usually "fail safe."

As the motor decelerates due to the reverse torque, its counterelectromotive force declines until a point is reached where the motor counterelectromotive force is less than the IR drop across the motor windings and the movable potentiometer contact. At this point, the low resistance path of the blocking rectifier permits a current to flow and pick up plugging relay 80.

When the plugging relay 80 picks up, it closes contacts 80a to actuate plugging contactor 90. From this point, the acceleration cycle is identical to that described previously.

Summary of operation

A typical cycle will proceed as follows: The master switch is moved to the forward position 6, closing directional contactors 20 and 22 to allow a controlled starting current to flow through the motor windings and resistors 92, 52 and 42. Plugging relay 80 is connected in a circuit between the positive supply conductor 14 and the movable contact on the potentiometer 8. The voltage across the potentiometer and the IR drop of the motor are additive and send a current through the plugging relay. Therefore, the plugging relay will close almost instantaneously after energizing the motor circuit with the master switch. The plugging relay closes plugging contactor 90 by a circuit through the master switch, contacts 20c and contacts 80a. The plugging contactor then seals itself in by means of its own contacts 90c and opens the circuit to the plugging relay by means of contacts 90b. The plugging relay can be a unit designed for intermittent duty only since it is used only momentarily in each cycle. Contacts 40a and 50a close to short resistors 42 and 52 after a predetermined interval of time determined by the timing relays 60 and 70.

To quickly reverse the motor, the master switch is moved through the "Off" position to reverse position 5. This momentarily deenergizes forward directional contactors 20 and 22, accelerating contactors 40 and 50, and plugging contactor 90. The reverse directional contactors 30 and 32 are now energized, connecting the motor for rotation in the opposite direction. During the reversing cycle the counterelectromotive force of the motor opposes the IR drop of resistors 92, 42 and 52 and insufficient current flows to actuate the plugging relay. Contacts 80a remain open to insure that the plugging contactor will not pick up. As the motor decelerates due to the reverse torque its counterelectromotive force decreases until a point is reached where the plugging relay picks up and the plugging contactor responds to short out the plugging resistance. From this point acceleration in the reverse direction follows the same sequence as starting the motor from rest.

When the motor is at full speed in the reverse direction, and it is desired to change direction quickly, the master switch is moved from the reverse position to the "Off" position. As in changing from forward to reverse passing the master switch through the "Off" position opens the circuits to all contactors and causes the directional and accelerating contactor to drop out. The motor is disconnected from the supply conductors and contacts 40a, 50a and 90a open to insert resistors 42, 52 and 92 into the motor circuit.

The switch is continued in motion to position 6. However, in this case the plugging relay will not pick up instantaneously as it did when the motor was started from rest. The counterelectromotive force of the motor armature is now opposing the IR drop of resistors 92, 42 and 52 so the potential difference between the positive supply conductor and the movable contact on potentiometer 8 is at a lower value depending on the speed of the motor at reversal and the setting of potentiometer 8. The motor slows down until the IR drop exceeds the counterelectromotive force by an amount equal to the pickup voltage of relay 80 and then continues to accelerate in a manner similar to starting from rest.

In this invention the plugging action is based solely on an accurate measurement of the counterelectromotive force. The novel feature of the potentiometer adjustment allows the plugging contactor to insert the plugging resistor into the circuit at a wide range of speeds which permits different operating conditions to be accommodated. The novel switching arrangement of contacts 32a and 22a allows a single plugging relay to control plugging in both directions. The plugging relay is normally deenergized and thereby provides a fail safe feature which prevents the plugging contactor from removing the plugging resistance in the event of plugging relay failure. Since this relay is in intermittent use it may be more sensitive than a type rated for continuous duty and may be selected for lower operating voltages.

While a preferred embodiment of the invention has been described and illustrated in accordance with the patent statutes, it will be understood that the elements shown and described are merely illustrative since different embodiments of the invention may be made without departing from the spirit and scope thereof.

What is claimed is:

1. A control system comprising a direct current motor with a field winding and an armature winding, a master switch with forward and reverse positions, forward directional contactors operable in response to said forward position of said master switch to connect said motor armature to be energized by the supply voltage for rotation in the forward direction, a plurality of current limiting resistors in circuit with said armature, a potentiometer connected to be energized by the voltage across said resistors, a variable tap on said potentiometer, a plugging relay connected by said forward directional contactor to be energized by the voltage across said armature and portion of said potentiometer included by said variable tap, a first contact closed in response to energization of said plugging relay, a plugging contactor energized in response to closing of said first contact for shorting one of said current limiting resistors and interrupting the circuit energizing said plugging relay, a timing relay, an accelerating contactor for shorting another of said current limiting resistors, contacts operable by said plugging contactor for sealing said plugging contactor in the actuated position and opening the circuit energizing said timing relay to begin the timing cycle, means connecting said accelerating contactor to be energized at the end of the cycle of said timing relay when said master switch is in said forward position, an off position of said master switch, means for deenergizing said plugging contactor, accelerating contactor, directional contactors and for interrupting circuit energizing said plugging relay, in response to said off position, a reverse position of said master switch, reverse directional contactors operable in response to reverse position of said master switch to connect said motor armature to be energized by supply voltage for rotation in reverse direction with the polarity of the armature counterelectromotive force reversed with respect to the supply voltage, said reverse directional contactors connecting said plugging relay to be energized by the voltage across said armature and portion of said potentiometer included by said variable tap, a blocking rectifier in series with the circuit energizing said plugging relay for preventing actuation of said plugging relay when the motor counterelectromotive force exceeds the IR drop across said motor and potentiometer, said blocking rectifier, armature counterelectromotive force and supply voltage coacting to hold said plugging relay deenergized until the speed of said motor decreases to a predetermined value determined by the setting of said tap on said potentiometer.

2. A plugging control system for a reversible electric motor comprising supply conductors, an electric motor with armature and field windings, a master switch with forward and reverse positions, forward directional contact means responsive to said forward position of said master switch for connecting said motor armature to be energized by the voltage across said supply conductors for rotation in a forward direction, means associated with said motor for plugging said motor in a forward or reverse direction comprising, a current limiting resistor in circuit with said motor armature, variable resistance means associated with said resistor for picking off a portion of the IR drop across said resistor, a plugging relay, a blocking rectifier in series with said relay, said relay connected by said forward directional contact means to be responsive to the IR drop across said motor armature and said variable resistance means when said motor is started in a forward direction, a first contact closed in response to energization of said relay, a plugging contactor energized in response to closing of said first contact, a second contact operable by said plugging contactor for shorting said resistor, additional contacts operable by said contactor for interrupting the circuit energizing said plugging relay and sealing said plugging contactor in the energized position, an off position of said master switch, means responsive to said off position for deenergizing said plugging contactor and directional contact means and for interrupting the circuit energizing said plugging relay, a reverse position of said master switch, reverse directional contact means operable in response to said reverse position to connect said motor armature to be energized by the voltage across said supply conductors for rotation in the reverse direction with the polarity of the armature counterelectromotive force reversed with respect to the polarity of the voltage across the supply conductors, said reverse directional contact means connecting said plugging relay to be responsive to the IR drop across said motor armature and the portion of said IR drop across said resistance picked off by said variable resistance means when said IR drop exceeds the counterelectromotive force of said motor armature by the pull in voltage of said plugging relay, said blocking rectifier holding said plugging relay deenergized when counterelectromotive force exceeds this value.

3. A control system for a motor comprising, a source of voltage, a motor having armature and field windings, circuit means connecting said armature and field windings to said source, and means for reversing the polarity of said source to one of said windings to reverse the direction of counterelectromotive force in said armature winding in a plugging operation, said means including, current limiting means connected in circuit with said armature winding, a plugging relay, a potentiometer in parallel with said current limiting means, rectifier means connecting said plugging relay to be responsive to the potential between one end of said motor windings and a point on said potentiometer whereby current will flow through said plugging relay only when the motor counterelectromotive force is less than the IR drop across said motor and portion of said resistance included by said variable tap, a plugging contactor, plugging circuit means including a circuit closing contact operated by said plugging relay, said plugging contactor operable in response to operation of said plugging relay and having a first contact operable to short circuit said current limiting means and a second contact means operable to open circuit said unidirectional circuit means, third contact means operable by said plugging contactor sealing said contactor in operated position, second current limiting means connected in circuit with said armature winding, an accelerating contactor responsive to said plugging contactor and having a contact operable to short circuit said second current limiting means, time delay means operable by plugging contactor for delaying operation of said accelerating contactor.

4. A control system for a motor comprising, a source of voltage, a motor having armature and field windings, circuit means connecting said armature and field windings to said source and means for reversing the polarity of said source with respect to one of said windings to reverse the direction of the counterelectromotive force of said armature winding during a plugging operation, said means including current limiting means in circuit with said armature winding, a plugging relay, a potentiometer in parallel with said current limiting means, rectifier means connecting said plugging relay to be responsive to the motor counterelectromotive force and the IR drop across said motor windings and the portion of said current limiting means included by a tap on said potentiometer, said rectifier means blocking current flow when the motor counterelectromotive force exceeds said IR drop, a plugging contactor having first, second and third contacts, means connecting a contact operable in response to said plugging relay to complete an actuating circuit for said plugging contactor, means connecting said first contacts to short circuit said current limiting means, means connecting said second contacts to seal said plugging contactor in the actuated position, means connecting said third contact to deenergize said plugging relay.

5. In a control system for a reversible electric motor having a field winding and an armature winding, means for limiting motor armature current during plugging comprising, a resistance in series with said motor windings, potentiometer having a variable tap, means connecting said potentiometer to be energized by the voltage across said resistance, relay means connected to be energized by the difference in potential between said variable tap and one side of said motor, rectifier means in circuit with said relay means and polarized to prevent actuation of said relay means by a reverse flow of current during plugging, contacts for shorting said series resistance, means responsive to said relay means for allowing actuation of said contacts to short said resistance only when said relay means is actuated.

6. In a control system for a reversible electric motor having a field winding and an armature winding, means for limiting motor armature current during plugging comprising, a resistance in series with said motor windings, a potentiometer having a variable tap, means connecting said potentiometer to be energized by the voltage across said resistance, relay means connected to be energized by the difference in potential between said variable tap and one side of said motor, rectifier means in circuit with said relay means and polarized to prevent actuation of said relay means in response to a reverse flow of current resulting from a high value of motor counterelectromotive force, contacts for shorting said series resistance, means for actuating said contacts, means responsive to said relay means for preventing actuation of said contacts except when said relay means is actuated.

7. In a control system for a reversible electric motor having a field winding and an armature winding, means for limiting motor armature current during plugging comprising, a resistance in series with said motor windings, a potentiometer having a variable tap, means connecting said potentiometer to be energized by the voltage across said resistance, relay means connected to be energized by the difference in potential between said variable tap and one side of said motor, rectifier means in circuit with said relay means and polarized to prevent actuation of said relay means in response to a high value of motor counterelectromotive force, contacts for shorting said series resistance, electromagnetic means for actuating said contacts to short out said plugging resistance, an actuating circuit for said electromagnetic means, normally open contacts in series with said actuating circuit responsive to said relay for preventing actuation of said shorting contact unless said relay is actuated.

8. In a control system for a reversible electric motor having a field winding and an armature winding, means for limiting motor armature current during plugging comprising, a resistance in series with said motor windings, a potentiometer having a variable tap, means connecting said potentiometer to be energized by the voltage across said resistance, relay means connected to be energized by the difference in potential between the motor counterelectromotive force and the IR drop across said motor and a predetermined portion of said resistance determined by the setting of said variable tap, rectifier means in circuit with said relay for preventing actuation of said relay when the motor counterelectromotive force exceeds said IR drop, means for shorting said series resistance, contacts operable by said relay, means connecting said contacts to prevent the shorting of said resistance unless said relay is actuated.

References Cited in the file of this patent

UNITED STATES PATENTS

| | | |
|---|---|---|
| 1,976,614 | James | Oct. 9, 1934 |
| 2,355,557 | Radley et al. | Aug. 8, 1944 |
| 2,646,540 | Taylor | July 21, 1953 |